United States Patent [19]

Stalego et al.

[11] 4,052,182

[45] Oct. 4, 1977

[54] PROCESS FOR PRODUCING AIR BLOWN GLASS FIBER STRAND MAT

[75] Inventors: Joseph P. Stalego; William H. Rigby, Jr., both of Newark, Ohio

[73] Assignee: Owens-Corning Fiberglas Corporation, Toledo, Ohio

[21] Appl. No.: 459,135

[22] Filed: Apr. 8, 1974

Related U.S. Application Data

[63] Continuation of Ser. No. 337,246, March 1, 1973, abandoned.

[51] Int. Cl.² .................................... C03C 25/02
[52] U.S. Cl. ................... 65/3 C; 252/189; 427/178
[58] Field of Search ....... 65/3; 117/126 GN, 126 GS, 117/126 GQ, 126 GB; 252/189; 427/178

[56] References Cited

U.S. PATENT DOCUMENTS

| | | | |
|---|---|---|---|
| 3,676,095 | 7/1972 | Stalego | 65/3 |
| 3,725,123 | 4/1973 | Marzocchi et al. | 428/378 |
| 3,773,607 | 11/1973 | Marzocchi | 260/42.15 |

*Primary Examiner*—Robert L. Lindsay, Jr.
*Attorney, Agent, or Firm*—John W. Overman; Philip R. Cloutier

[57] ABSTRACT

A process of making a mat of glass fibers wherein a strand of glass fibers frictionally engages the surface of a revolving cylinder from which the strand is tangentially discharged onto a moving conveyor. The strand is caused to be randomly looped upon the conveyor by alternate blasts of air which laterally impinge upon the strand to throw the strand in a looped fashion from side to side across the conveyor. More efficient and sustained operation in the processing of glass fiber mat is obtained by wetting the individual filaments of glass with a water solution comprising organosilane, nonionic lubricants, and acidic salt, which water solution eliminates wheel wrap of the glass fiber strand around the revolving cylinder without adversely affecting other desirable properties of the strand and the mat.

11 Claims, 2 Drawing Figures

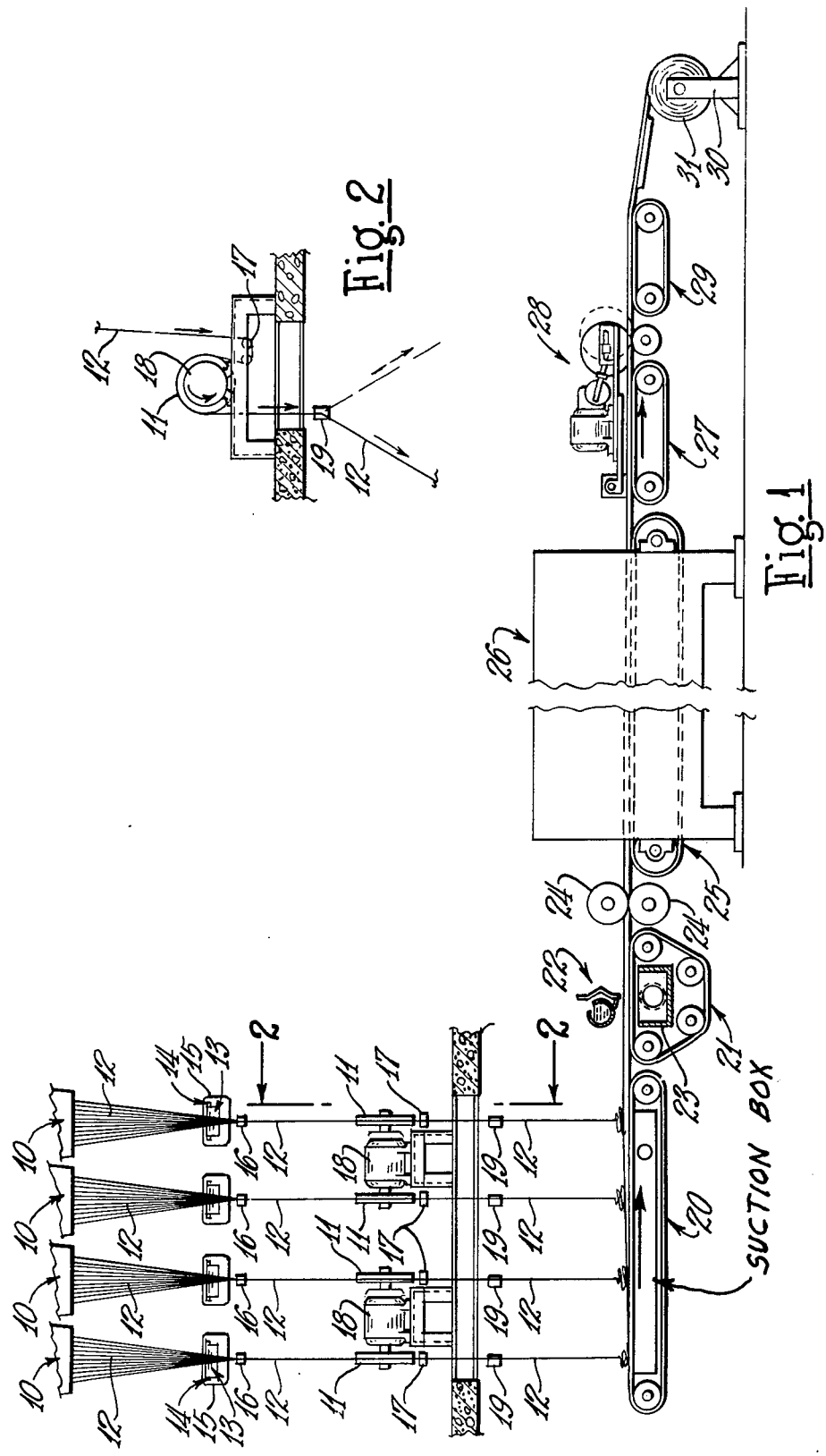

PROCESS FOR PRODUCING AIR BLOWN GLASS FIBER STRAND MAT

This is a continuation, division, of application Ser. No. 337,246, filed Mar. 1, 1973 now abandoned.

BACKGROUND OF THE INVENTION

Mats of glass fibers can be made by several different processes. The general type of glass fiber mat making machinery with which we are concerned is generally shown in U.S. Pat. No. 2,736,676, U.S. Pat. No. 3,599,848 and U.S. Pat. No. 3,676,095. In the process in which the present invention has particular advantages, molten streams of glass fibers are pulled into very fine filaments by a revolving drum over which the filaments are wrapped. The filaments are discharged tangentially downwardly from the revolving drum onto a moving foraminous conveyor or moving foraminous collection surface with moves the mat that is laid down on the conveyor through subsequent operations where a binder is applied and through an oven where the binder is cured. The filaments which are discharged onto the conveyor are thrown from side to side across the conveyor by the impingement of alternate lateral blasts of air. The lineal speed of the strand is many times the speed at which the strand traverses the conveyor, so that the strand assumes a looped condition on the conveyor. After the molten streams of glass are attenuated into filaments and before these filaments reach the revolving drum, they are coated with an aqueous lubricating material and are brought together in the from of a strand. This aqueous material is generally referred to as a sizing which functions to prevent the fibers from breaking as they pass around guide surfaces and are pulled over the surface of the revolving drum. The sizing also must perform the function of preparing the surface of the fibers for proper wet-out by a binder material which is subsequently applied to the mat formed on the conveyor for the purpose of holding the fibers together.

Men working with apparatus which functions according to the process above described, have tried solutions of many materials including conventional starches and cationic lubricants, such as the reaction product of tetraethylene pentamine and stearic acid in a molar ratio of 1 to 1.8 as a lubricant to protect the fibers from abrasion. Some of these sizings, while providing proper lubrication to the fibers, have prevented a proper random looping of the strand on the conveyor. Others have caused the fibers to wrap around the revolving drum to thereby disrupt the process. Still others have caused inefficiency in operation of the apparatus, especially in respect to an objectionable build-up of solids from the sizing on the apparatus. Some of the materials that have been applied heretofore have produced a mat whose strength crosswise of the mat was appreciably greater then the strength lengthwise of the mat. Other materials provide for lengthwise and crosswise strength characteristics of the mat to be of the same magnitude. However, until the present invention, it has not been possible to prevent build-up of sizing solids on this apparatus, particularly the revolving drum.

A principal objective of the present invention is the improvement of the above described process, to achieve more efficient and sustained operation in the processing of glass fiber mat without adversely affecting other desirable properties of the strand and the mat.

SUMMARY OF THE INVENTION

According to the invention, it has been found that the processability of a mat comprising random swirls of glass fibers can be improved when using the equipment above described without affecting other desirable properties, especially high generally equal strengths in both the length and width dimensions of the mat, provided that the fibers are first wetted with an aqueous solution comprising nonionic lubricants, organosilane coupling agent and an acidic salt. It has been found that the proper random distribution of the strand is achieved in the process above described without additional mechanical guiding action of the strand as it is laid down upon the conveyor to form the mat. Prior to the present invention, it was known that this result was possible in a mat, the fiber pattern of which is achieved with air jets alone, but it was not known how to improve the efficiency of the operation.

Using the sizings of the present invention to improve the process above-described does not adversely affect other desirable properties of the strand or the mat, especially high approximately equal strengths both lengthwise and crosswise of the mat. The strand in the form of mat is subsequently wetted with a binder and cured. The efficient usage of organosilane coupling agents in the sizing is apparently responsible for the higher strengths because of better bonding of the organosilane to the fibers by maintaining the organosilane in the monomeric state. It appears that when the non-ionic lubricant's principal constituent is a polyoxyethylene polyhydric alcohol condensate grouping, either oxygen of the polyoxyethylene groups of an adduct of a polyhydric alcohol are capable of affecting a secondary bond with hydrolyzed organosilane molecules apparently through the OH groups attached to the silicon atoms. This appears to have the effect of holding the hydrolyzed organosilane molecules separated to prevent them from forming dimers, trimers and high siloxanes. Because the lubricants are non-ionic, the molecules of hydrolyzed organosilane are preferentially attracted to the surface of the glass, to which they attach in the monomeric state. This may occur in the presence of water to an appreciable degree and will occur substantially completely upon drying. This increase in effectiveness of the coupling agent has been explained as a reason for higher over-all strengths that are achieved, and the present invention does not interfere therewith.

The fact that the mat has the same high strength both longitudinally and crosswise of the mat is believed to be attributed to an improved circular pattern of the strand forming the mat. It has been noticed that strand wetted with the sizing solution of the present invention does not adversely affect the firmness of the strand in the finished mat which has been achieved heretofore. The firmness of the strand has been attributed to the polyhydric group which attracts water molecules to cause the sizing to have a high surface tension. There has also been noticed less mist being driven from the strand by the lateral jets which produce the lateral distribution of the strand across the conveyor. This appears to be further evidence that the non-ionic lubricant molecules not only hold a plurality of the silane molecules in spaced apart relationship, but that the lubricant molecules also help to hold water intact around the fibers. Because the strand does not separate into filaments while it is wet, the strand flexes in uniform swirls to provide more uniform fiber distribution in all directions.

It has been noticed that the treatment of the present invention does not adversely affect or materially alter the low air pressures which are used to traverse the strand across the conveyor, which low pressures have been attributed to greater retention of water on the strand. The retention of more water gives the strand more integrity to carry it laterally across the conveyor. The improved directional uniformity of strength in the mat, which has been attributed to circular swirls instead of an elliptical pattern with the major axis of the swirls being crosswise to the conveyor is not adversely affected by treating the strand according to the present invention.

The combination of at least one organosilane coupling agent and at least one non-ionic lubricant comprising a polyoxyethylene polyhydric alcohol adduct, produces a combination of effects which include: the provision of an aqueous solution having high surface tension to hold the fibers in a tight strand; thorough wetting of the fibers since a high percentage of the lubricant is hydrophilic; the provision of secondary forces for retention of the organosilane molecules in their monomeric condition; the retention of a large amount of water due to ether oxygen and/or OH groups; and the lack of interference with the attraction of the silane for the surface of the glass, since the lubricant is non-ionic. Other non-ionic lubricants without a polyoxyethylene polyhydric alcohol adduct may be used in combination with the above-described lubricant and at least one coupling agent, further in combination with an acidic salt to improve processability of the mat. That is, interference from wheel-wraps of strands on the revolving drum is eliminated without affecting other desirable properties described above when an acidic salt is added to the sizing composition.

The addition of an acidic salt to the sizing composition, preferably an ammonium slat, for example ammonium sulfate, for some unexplained reason prevents or eliminates the build-up of solids from the sizing composition on the revolving drum and other associated glass handling apparatus. Since the revolving drum attenuates glass fibers, which glass fibers are subsequently sized or coated and gathered into a strand and distributed onto a conveyor to form a mat, any disruption in the operation of the revolving drum, e.g. shut-down to clean wheel-wraps of strand therefrom, causes inconvenience and economic problems, and may lead to quality control problems and eventual cessation of the production of the mat.

The addition of the acidic salt is also useful in other conventional fiber forming operations employing conventional sizings in order to prevent build-up of solids from the sizing on glass handling equipment. However, in the formation of continuous strand mat, the continuous operation of the rotating wheel is very critical to the process, especially since a plurality of rotating wheels or drums are used to form the continuous strand mat. When one rotating wheel or drum becomes fouled because of wheel wraps or sizing solids build-up on the wheel or drum, which sizing solids build-up causes glass fibers to break and/or prevent the proper release of the glass fiber strand from the rotating wheel, and ultimately cause wrapping of the strand about the wheel, the glass filaments, instead of being attenuated by the revolving drum, are attenuated by an off-line, auxilliary means, such as a winder, in order to maintain the operation of the feeder containing molten glass. However, the glass filaments that are attenuated by the auxilliary means is scrapped. The amount of waste can be considerable considering that replacement of the drum or wheel with a clean drum or wheel takes approximately 30 minutes. There is also the task of cleaning the fouled wheel or drum, which takes about 2 to 3 hours. The speed of the conveyor is reduced proportionately to the amount of glass fiber strand that is temporarily diverted from the conveyor in order to insure that the proper lay-down of the strands, on a weight basis, is maintained. When the replacement wheel or drum is installed and the glass filaments are attenuated by the replacement wheel instead of by the auxilliary means, the line speed of the conveyor is then increased to normal.

Prior art sizings used to protect the glass fibers being attenuated by means of a rotating drum or pull-wheel caused the pull-wheel to become fouled with solids from the sizings. During the first 24 hours of operation, the prior art sizings performed satisfactorily, whereby only about 0.6 to about 0.8 break-outs/hour/wheel occurred. However, after about 24 hours of operation, approximately 2-3 break-outs/hour/wheel occured, thereby leading to quality-control problems, the requirement of additional personnel to replace the fouled wheels and to eventual shut-down of the operation. "Break-outs" are defined as a breaking of the glass fibers at any point between the feeder and the pull-wheel.

When the sizings of the present invention are used however, the process not only operates satisfactorily for the first 24 hours but does so on a continuous basis, without limit to time. That is, the number of break-outs in the process is maintained at about 0.6 to about 0.8 per hour per wheel upon using the sizings of the present invention.

When a plurality of the revolving drums or wheels are not operating properly and require shut-down, representing a temporary loss of about 20–30 percent of the total glass strands supplied to the conveyor, the process is greatly slowed down but can continue without materially affecting the quality of the mat. However, above about 30% loss of strand supplied to be conveyor, the quality of the mat is adversely affected and the entire operation must be stopped. This is due to insufficient and poor distribution of glass fiber strands to the mat, which thereby leads to inadequate strengths in the lengthwise and crosswise directions of the mat.

BRIEF DESCRIPTION OF THE DRAWINGS

FIG. 1 is a side elevational view of apparatus capable of performing the process of the present invention;

FIG. 2 is a sectional view taken approximately on the line 2—2 of FIG. 1.

DESCRIPTION OF THE PREFERRED EMBODIMENTS

FIGS. 1 and 2 of the drawings show apparatus which perform manipulative steps in which the present invention has particular advantages. In the apparatus shown in FIGS. 1 and 2, molten streams of glass which issue from small openings in the bottom of a molten glass tank 10 are attenuated into fibers by the pulling action of a revolving cylinder 11 over which the fibers pass. Before reaching the cylinder 11, the fibers 12 are drawn over an applicator 13 which coats the fibers with an aqueous solution. The applicator 13 shown in the drawing comprises an endless belt which passes over a revolving pulley 14 to form an arc over which the fibers are drawn. The endless belt extends down into a tank 15 of the coating solution so that a continuing supply of the coating solution is brought to the belt area contacted by the fibers. The coated or "sized" fibers are drawn over a V-shaped guide 16 which groups the fibers into a strand 12 following which they pass downwardly around the idler pulley 17 and then upwardly over the revolving cylinder 11. The revolving cylinder 11 is of the type known in U.S. Pat. No. 3,071,301, and is driven by a synchronous motor 18. The fibers engage approximately 180° of the cylinder surface to leave the cylinder on the opposite side from the idler roll 17 on a tangentially downward path. The strand leaving the revolving cylinder 11 passes between a pair of air jets 19, respective ones of which are positioned laterally on opposite sides of the strand. The air jets 19 are alternately supplied with air pressure which issues in a narrow stream several inches wide to blow the strand alternately from one side edge of the gathering conveyor 20 to the opposite side edge of the conveyor 20. The lineal velocity of the strand is many times the speed at which the air jets move the strand laterally, so that the strand forms randomly oriented loops while it is moving laterally from side to side across the conveyor. The conveyor 20 is formed of metal screen, and the looped strand that is formed on its top flight is compacted and held positioned by a flow of air downwardly through the top flight of the conveyor. This air flow is produced by a suitable exhaust fan, not shown.

The mat that is formed on the endless conveyor 20 is transferred to another screen conveyor 21 where a water solution, preferably of a thermosetting binder, is caused to impregnate the mat. The impregnation can be done in any manner which does not disturb the lay of the fibers, and as shown in the drawing, is performed by a stream of a binder solution which issues from a trough 22 which extends crosswise of the conveyor. The thin stream of binder solution which issues from the trough 22 flows downwardly through the mat and through the porous screen conveyor to a binder collection tray 23 from which the excess binder is pumped back into the trough 22.

The mat which leaves the conveyor 21 has fibers which are coated with a thin coating of the binder solution and which forms droplets in the area where one strand touches another strand. This mat is compressed by rolls 24 and is then transferred to another endless conveyor 25 which moves the mat through an oven 26 where the water in the mat is evaporated, and the binder is transformed into a thermoset condition. The binder in the droplets of water which previously bridge the strand at their crossover points now firmly holds the crossing strands together to give the mat strength in all directions. The mat is then transported by a conveyor 27 past a rotary cutter 28 which trims the edges A conveyor 29 then moves the mat to a roll stand 30 where it is wound into a coiled packaged 31.

When a thermoplasitc binder is used to impregnate the mat, it preferably is in the form of a powder, but it may be in the form of an aqueous dispersion. The mat with the thermoplastic binder thereon is advanced to an oven for drying and fusing of the thermoplastic binder to the crossover points of the glass fibers to give the mat strength in all directions.

The apparatus above described has been used to produce mat using aqueous solutions of size materials and binder materials. The following examples are illustrative of the practice of this invention, which is particularly directed to the sizing solutions used in the processing of the mat.

Example I

| Ingredients | Percent By Weight |
| --- | --- |
| Polyoxyethylene sorbitan monostearate | 0.05 – 0.70 |
| Acidic salt | 0.02 – 0.40 |
| Organosilane | 0.10 – 0.85 |
| Octylphenoxypoly(ethyleneoxy)ethanol | 0.05 – 0.35 |
| Water (deionized) | Balance |

Example II

| Ingredients | Percent by Weight |
| --- | --- |
| Polyoxyethylene sorbitan monostearate | 0.10 – 0.40 |
| Acidic salt | 0.03 – 0.30 |
| Aminosilane | 0.015 – 0.75 |
| Octylphenoxypoly(ethyleneoxy)ethanol | 0.075 – 0.25 |
| Water (deionized) | Balance |

Example III

| Ingredients | Percent By Weight |
| --- | --- |
| Polyoxyethylene sorbitan monostearate | 0.168 |
| Ammonium sulfate | 0.053 |
| Gamma-aminopropyltriethoxysilane | 0.268 |
| Octylphenoxypoly(ethyleneoxy)ethanol | 0.126 |
| Water (deionized) | Balance |

Example IV

| Ingredients | Percent By Weight |
| --- | --- |
| Octylphenoxypoly(ethyleneoxy)ethanol | 0.05 – 1.50 |
| Acidic salt | 0.01 – 0.40 |
| Organosilane | 0.05 – 0.80 |
| Water (deionized) | Balance |

Example V

| Ingredients | Percent By Weight |
| --- | --- |
| Polyoxyethylene sorbitan monostearate | 0.30 – 0.90 |
| Acidic salt | 0.01 – 0.40 |
| Organosilane | 0.05 – 0.80 |
| Water (deionized) | Balance |

To a mixing tank equipped with a propeller-type agitator, deionized water was added and maintained at a temperature of from about 120° F. to about 150° F. The water was agitated during the addition of the polyoxyethylene sorbitan monostearate, the acidic salt, the organosilane and the octylphenoxypoly(ethyleneoxy)ethanol. The agitation was continued for about 5–30 minutes. The pH of the above water solutions ranges from about 8.0 to about 11.0.

The polyoxyethylene sorbitan monostearate was purchased under the tradename "TWEEN 60". The acidic salt is generally an ammonium salt, and is preferably ammonium sulfate but may be any material which when hydroxyzed, yields an acidic solution. Other conventional acidic salts, including ammonium phosphate, ammonium chloride, ammonium nitrate, ammonium perchlorate, ammonium sulfonate, ammonium phsophonate and combination thereof may be used. The gamma-aminopropyltriethoxysilane was purchased under the tradenames "A-1100", "SC-3900" and "SC-3901". The vinyl-tris(beta-methoxyethoxy)silane was purchased under the tradename "A-172". The gamma-methacryloxypropyltrimethoxysilane was purchased under the tradename "A-174". The Gamma-gylcidoxypropyltrimethoxysilane was purchased under the tradenames "Z-6040" and "A-186". The octylphenoxypoly(ethyleneoxy)ethanol was purchased under the tradename "IGEPAL CA-630."

Generally, the amounts of the ingredients of the sizing are as stated above, in ranges, to insure that desirable processing and product properties are obtained. However, process conditions and materials may vary thereby prompting variance in the amounts of the ingredients in the sizing composition. Generally, the amounts given above are within the practice of this invention, but the amounts are not of a critical nature, and may be expressed in the following sense. A sufficient amount of lubricant(s) is added to the aqueous solution which is applied to the glass fibers to insure that the glass fibers process well without causing break-outs of the glass fibers of the strands and/or wheel-wraps. Conversely, an insufficient amount of lubricant(s) is added to the aqueous solution to insure that forming of the sizing, especially at the applicator does not occur. The amount of organosilane added, is that quantity which is sufficient to yield the desired strengths in the formed mat. The amount of acidic salt added, is that quantity which is sufficient to prevent build up of solids from the sizing on the rotating wheel but insufficient to adversely affect desirable properties of the strand and the mat, particularly the filamentization of the glass fibers from the strand and also the distribution of the strands on the conveyor.

The above compositions were applied to advancing glass fibers by means of a roll applicator or other conventional means, as the glass fibers were being attenuated from feeders or bushings. Subsequently the sized glass fibers were collected into strands for advancement and distribution to a conveyor to form a mat. The mat thus formed, using the above sizing or pretreatment composition, was then wet-out by a binder solution, such as a binder comprising the following composition:

| Ingredients | Amount (lbs.) | Solids (lbs.) |
|---|---|---|
| Starch (thickening agent) | 52.5 | 52.5 |
| Bone glue (syrup) | 72 | 66.25 |
| Dimer acid (softening agent) | 15 | 15 |
| Phenol formaldehyde resin | 117 | 57.5 |
| Petroleum oil emulsion | 15.5 | 10 |
| Water | Balance | (to about 15 percent solids) |

The binder composition was made by adding water to a mix tank, heating the same to about 190° F., and thereafter adding the starch. The starch solution was cooled to about 140° F. and the dimer acid and bone glue were added. The material was thoroughly mixed and adjusted to a pH of about 8.0 using ammonium hydroxide. The phenol formaldehyde resin was then added, and the pH adjusted to about 8.0, following which the petroleum oil emulsion was added, and mixed for 10 minutes. Prior to the application of the binder to the mat, the binder was diluted with water to a solids of about 5-9 percent.

In the above composition the petroleum oil emulsion is used as a release agent for the conveyors, and the bone glue reacts with phenol formaldehyde to give a quick set resin. The dimer acid is a dimer of stearic acid sold under the tradename of "EMPOL 1022" by Emery Industries, Inc. The dimer acid is used to increase flexibility and toughness of the resin. The starch provides a thickening action for the composition and does so without interfering with the formation of the resin binder, since it is capable of forming methylene bridges with the phenolic material.

Using this binder material the oven 25 was operated at approximately 400° F. The cylinders or drums 11 were operated at a peripheral speed of about 14,000 feet per minute and the strand produced comprised 402 filaments each having an average diameter of 0.00025 inch. The strands were caused to traverse the conveyor by alternate blasts of air supplied the nozzles and the strands were blown apart into individual filaments, i.e. fully dispersed. The finished mat was approximately 0.018 inch thick and weighed about 2.0 pounds per 100 square feet.

Any type of tetrahydric alcohol radical containing six carbon atoms can be used as the intermediate portion of the lubricant molecule in cooperation with any type of aminosilane, as for example: gamma-aminopropyltrimethoxy silane, gamma-aminopropyltriethoxysilane, n(trimethoxysilopropyl) ethylene diamine, n-(dimethoxymethylsiloisobutyl) ethylene diamine. The amino silanes preferably contain three hydrolyzable groups which may be halogens, alkoxy groups, etc. and further examples of these materials may contain the following radicals:

—$CH_2CH_2CH_2NH_2$
—$CH_2CH_2CH_2NCONHCH_2CH_2$ Lecithin
—$(CH_2)_3N(CN_3)CH_2CHOHCH_2O$ methacrylate
—$(CH_2)_3NHCH_2CH_2NH_2$
—$(CH_2)_3N(CH_3)COCH-CHCOOH$ Additionally, any hydrolyzable organosilane can be used with the concepts of this invention, in which the organo group attached to the silicon group is selected from the group which includes epoxy, such as gamma-glycidoxypropyltrimethoxysilane and beta(3,4-epoxycyclohexyl)ethyltrimethoxysilane, alkenyl, such as vinyl-tria(beta-methoxyethoxy)silane, acrylate, such as gamma-methacryloxypropyltrimethoxysilane, mercapto and carboxyl, such as N-[3-(triethoxysilyl)-propyl]maleamic acid.

The undispersed strand of the present invention is produced with water solutions having an acidic salt therein, wherein the salt is present in an amount sufficient to prevent build-up of the sizing solids, present in the water solutions, on the revolving drum and related glass fiber handling apparatus, but in an amount insufficient to prevent the sized glass fibers from properly filamentizing.

The mat of the present invention produced as above described has particular advantages when it is used to reinforce asphaltic materials and/or organic resins to produce laminates. A particularly useful product is made when the mat is impregnated with asphaltic material and coated with a tack reducing particulate material to form a roofing material. The roofing material so formed has much greater strength, and is much more puncture resistant than is a roofing material made from the same weight of glass fibers, which are fully dispersed rather than being in substantially the integral strand form. The integral strand mat of the present invention groups fibers at stress points to take concentrated loads such as occur when personnel walk across the roofing. Similarly, improved results are obtained when the integral strand mat of the present invention is used to reinforce organic resins, either thermoplastic resins or thermoset resins. Particularly useful composites are made by thermoset epoxy resins and polyester resins reinforced by the mat of the present invention, and another useful composite is obtained when phenolic thermoset resins are reinforced by the integral strand mat of the present invention. Some of the thermoplastic resins which may be reinforced by the mat of the present invention include polyvinyl chloride, polyvinyl acetate, nylon, polyethylene, polypropylene, acrylic and styrene-butadiene. When organic resins are reinforced with the mat of the present invention it is sometimes desirable to use binders comprising epoxy and/or polyester resins and to employ silanes selected from the group consisting of epoxy silanes, alkenylsilanes, acrylatesilanes, mercaptosilanes, and carboxy silanes, either along or in combination with the aminosilanes.

While the invention has been described in considerable detail, it is not intended to be limited to the particular embodiments shown and described, and it is my intention to hereby cover all novel adaptations, modifications, and arrangements thereof which come within the practice of those skilled in the art to which the invention relates.

We claim:

1. In the process of making mats of glass fiber strands, comprising the steps of attenuating molten streams of glass into fibers, gathering the fibers into strands, passing the strands over respective revolving wheels which wheels attenuate the glass fibers and deliver the strands downwardly to a moving foraminous collection surface, causing the strands to be traversed back and forth across the moving foraminous collection surface at a rate that is a fraction of the rate of the delivery downwardly by the revolving wheel, and depositing the strands upon the collection surface by air flow downwardly through the conveyor to form a mat, the improvement comprising contacting the fibers with an aqueous solution consisting essentially of water, an organosilane, a polyhydric alcohol adduct and an inorganic acidic salt, said acidic salt being present in said solution in an amount sufficient to improve the processibility of said fibers during attenuation.

2. The process of claim 1 wherein said solution contains from about 0.01 to about 0.40 percent by weight of said acidic salt.

3. The process of claim 1 wherein said solution contains from about 0.015 to about 0.85 percent by weight of said organosilane, from about 0.05 to about 1.50 percent by weight of said polyhydric alcohol adduct, and from about 0.01 to about 0.40 percent by weight of said acidic salt.

4. The process of claim 1 further comprising the steps of applying a binder composition to the mat, draining excess composition from the mat and curing the binder at cross-over points formed by the strands comprising the mat, whereby a mat having substantially equal strength longitudinally and transversely of the mat is produced.

5. The process of claim 1 wherein the acidic salt is selected from the group consisting of ammonium sulfate, ammonium phosphate, ammonium chloride, ammonium nitrate, ammonium perchlorate, ammonium sulphonate, ammonium phosphonate and combinations of said salts.

6. The process of claim 1 in which said organosilane is selected from the group consisting of aminosilanes and hydrolyzable organosilanes in which the organo radical attached to the silicon group is selected from the group consisting of epoxy, alkenyl, acrylate, mercapto and carboxyl radicals.

7. The process of claim 1 in which polyhydric alcohol adduct is a polyoxyethylene polyhydric alcohol adduct.

8. The process of claim 1 in which said polyhydric alcohol adduct is octylphenoxypoly(ethyleneoxy)ethanol.

9. The process of claim 1 in which said organosilane is gammaaminopropyltriethoxysilane, said polyhydric alcohol adduct is octylphenoxypoly(ethyleneoxy)ethanol and said acidic salt is ammonium sulfate.

10. A composition consisting essentially of
a. at least one glass fiber;
b. an organosilane;
c. a polyhydric alcohol adduct; and,
d. an acidic salt.

11. In the process of making mats of glass fibers in which said fibers are sized with an aqueous solution prior to the deposition of said fibers in the form of a mat, the improvement comprising contacting said fibers with an aqueous solution consisting essentially of water, an organosilane, a polyhydric alcohol adduct and an inorganic acid salt, said solution containing about 0.015 to about 0.85 percent by weight of said organosilane, from about 0.05 to about 1.50 percent by weight of said polyhydric alcohol adduct and from about 0.01 to about 0.40 percent by weight of said inorganic acid salt, said salt being selected from the group consisting of ammonium sulfate, ammonium phosphate, ammonium chloride, ammonium nitrate, ammonium perchlorate, ammonium sulphonate, ammonium phosphonate and combinations of said ammonium salts, and said organosilane being selected from the group consisting of aminosilanes and hydrolyzable organosilanes in which the organo radical attached to the silicon group is selected from the group consisting of epoxy, alkenyl, acrylate, mercapto and carboxyl radicals.

* * * * *